United States Patent [19]

Seddon

[11] 4,350,851
[45] Sep. 21, 1982

[54] OVERHEAD ELECTRIC TRACTION SYSTEMS

[75] Inventor: Alan E. Seddon, Rainford, England

[73] Assignee: BICC Limited, London, England

[21] Appl. No.: 216,210

[22] Filed: Dec. 15, 1980

Related U.S. Application Data

[63] Continuation of Ser. No. 937,811, Aug. 29, 1978, abandoned.

[51] Int. Cl.³ .............................................. B60M 1/18
[52] U.S. Cl. ..................................................... 191/39
[58] Field of Search ............................ 191/39; 238/152

[56] References Cited

U.S. PATENT DOCUMENTS 4,209,130 6/1980 Sundsrud ........................ 191/39 X

FOREIGN PATENT DOCUMENTS 238110 2/1960 Australia ............................... 191/39
718009 11/1954 United Kingdom ................ 238/152
726310 3/1955 United Kingdom ................ 238/152

Primary Examiner—Richard A. Schacher
Attorney, Agent, or Firm—Buell, Blenko, Ziesenheim & Beck

[57] ABSTRACT

In lightweight fabricated equipment of an overhead electric traction system, (e.g. section insulators and neutral sections), comprising at least one tension insulator mechanically connected between and electrically insulating from one another two elongate metal members, in at least one mechanical connection between the tension insulator and elongate metal member, an insulating end part of the tension insulator and an end part of the elongate metal member overlap and are interconnected by separate securing bolts. The undersurfaces of the end parts of the tension insulator and elongate metal member constitute a smooth running surface.

8 Claims, 4 Drawing Figures

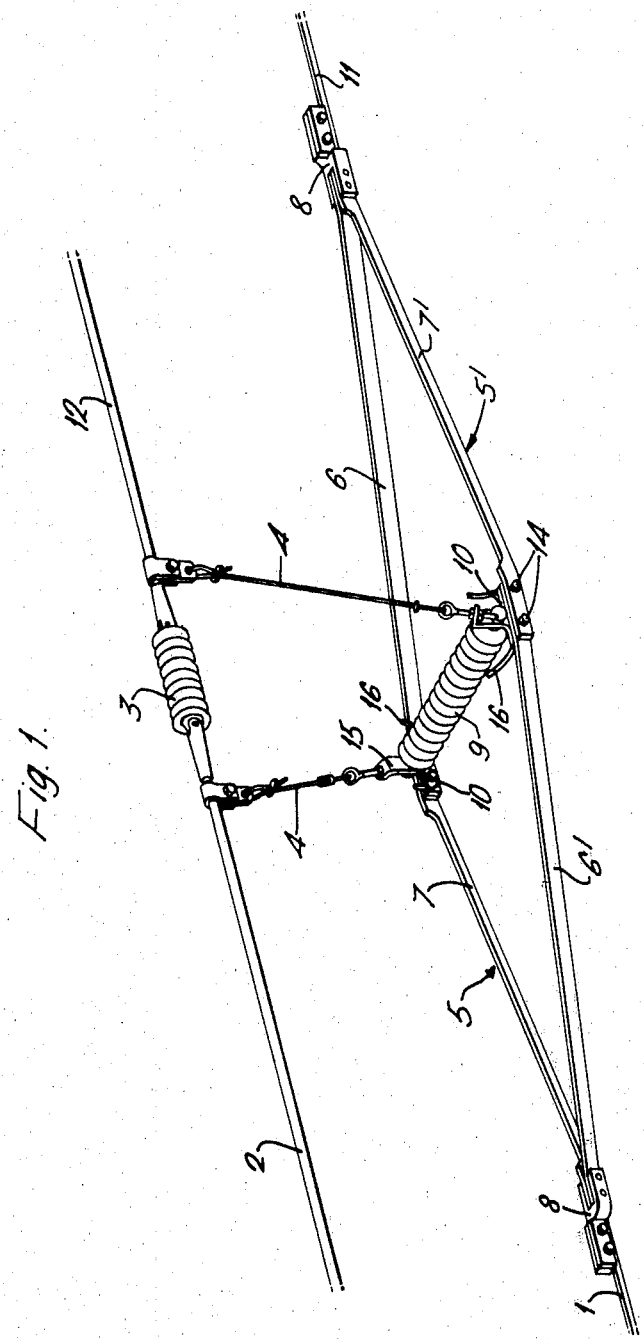

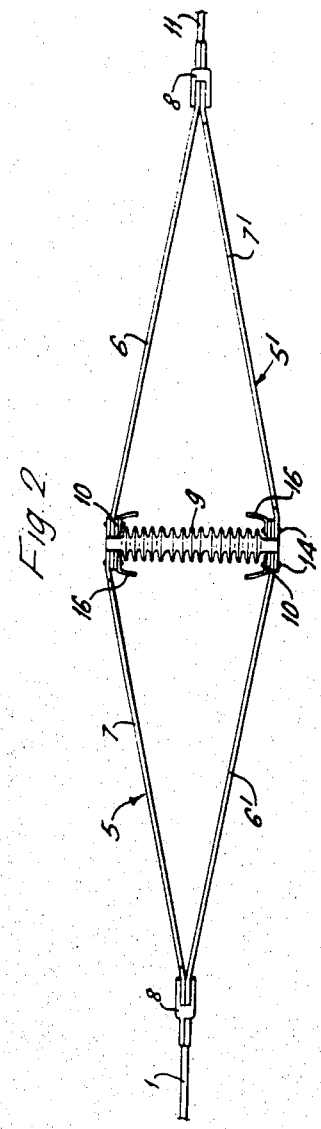

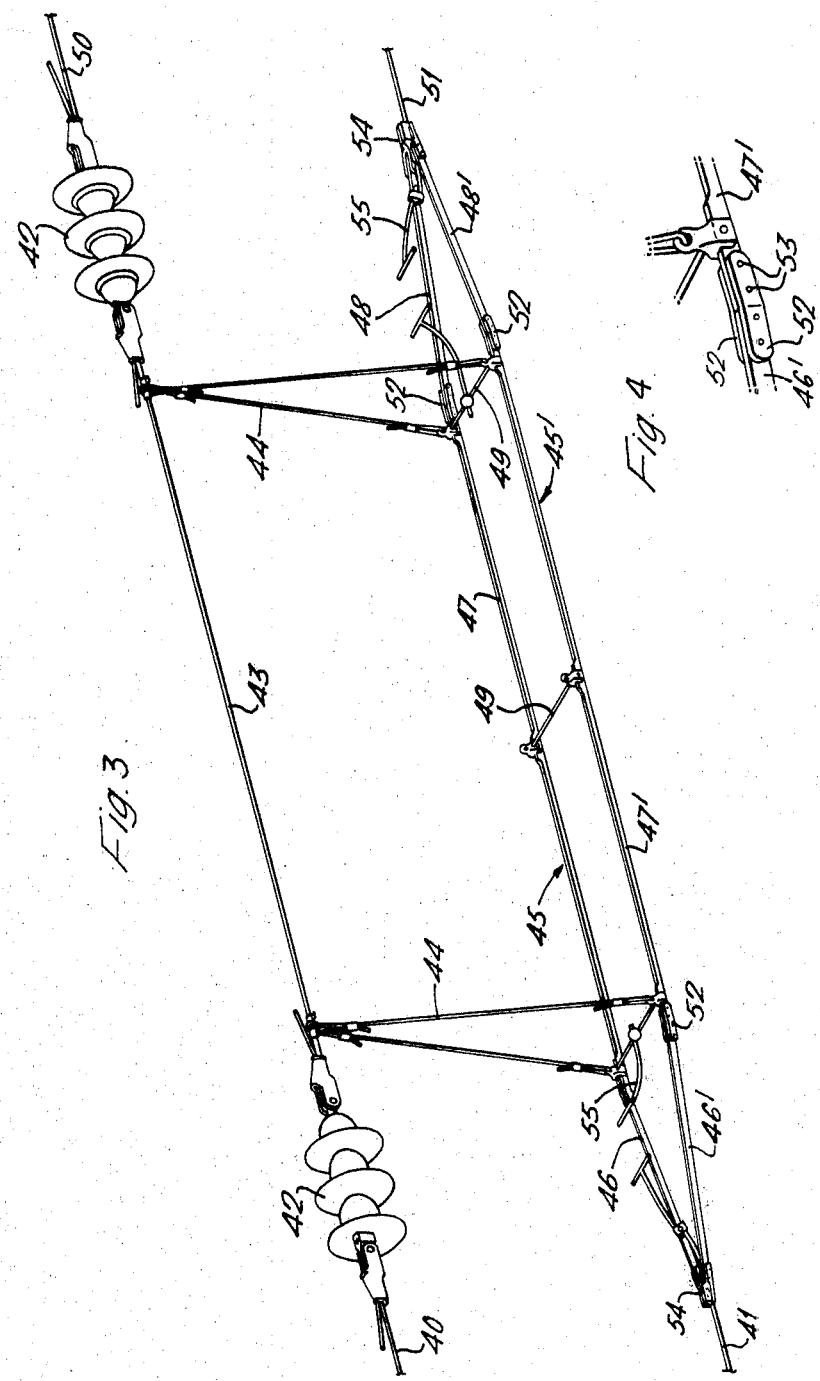

OVERHEAD ELECTRIC TRACTION SYSTEMS

This application is a continuation of my copending application Ser. No. 937,811, filed Aug. 29, 1978 and now abandoned.

This invention relates to overhead electric traction systems in which current is collected from an overhead contact wire by means of a collector of the kind comprising a shoe or bar which extends transversely of the contact wire and is, in its operative position, pressed upwards into contact with the underside of the contact wire, usually, but not in all cases, by mounting it on a spring loaded pantograph mechanism mounted on the roof of a vehicle.

In section insulators, neutral sections and other fabricated equipment of overhead electric traction systems in which two lengths of contact wire are directly or indirectly mechanically connected together but electrically insulated from one another by at least one tension insulator whose undersurface may serve as a running surface for a collector, it is the general practice to connect an end of the tension insulator to an end of a contact wire, or of an elongate metal runner connected to a contact wire, by means of at least one separately formed metal fitting. Where, as is now customary, a tension insulator comprises a rod of resin bonded glass fibre, it is common practice to secure one end of a metal fitting to an end of the resin bonded glass fibre rod by a compression joint and to connect the other end of the metal fitting to a second metal fitting secured to one end of a contact wire or of an elongate metal runner. The use of several such metal fittings in such fabricated equipment of an overhead electric traction system substantially increases the overall weight of the equipment and it is an object of the present invention to provide, in fabricated equipment of an overhead electric traction system, a mechanical connection between a tension insulator and an elongate metal member that is substantially lighter in weight than other forms of mechanical connection hitherto proposed for this purpose.

According to the invention, in at least one of the mechanical connections between an end part of the tension insulator or at least one of the tension insulators and an end part of an elongate metal member constituting components of the fabricated equipment, said end parts overlap and are interconnected by separate securing means or said end parts substantially abut or are spaced apart and have a supplementary connecting member overlapping and connected to each of them by separate securing means, the undersurfaces of said end parts of the tension insulator and elongate metal member, and when present the undersurface of the supplementary connecting member, constituting a smooth running surface for a collector travelling beneath and in contact with the mechanical connection.

Where said end parts of the tension insulator and elongate metal member overlap, preferably at least one supplementary connecting member overlaps and is connected to said overlapping end parts by separate securing means.

The end part of the tension insulator may be a part of a metal terminal fitting secured to the end of the tension insulator, or it may be an end part of an elongate member of electrically insulating material that constitutes the tension insulator.

Preferably, in all cases those surfaces of the end parts of the tension insulator and elongate metal member that are in contact with one another and or with a supplementary connecting member are of substantially planar form and preferably lie in substantially vertical planes. Preferably, also, the end parts are connected together and/or to the supplementary connecting member by at least two longitudinally spaced bolts.

The mechanical connection as hereinbefore described is especially, but not exclusively, suitable for use in the fabrication of a section insulator of the kind in which the contact wires of two neighbouring sections of an overhead electric traction system are mechanically connected together but electrically insulated from one another by at least two runners, each comprising a tension insulator and at least one elongate metal member mechanically connected together as hereinbefore described, which runners are attached at each of their ends to the end of a contact wire and are so disposed that the metal member, or one of the metal members, of one runner or a supplementary connecting member mechanically and electrically connected thereto, overlies the metal member, or one of the metal members of a second runner, or a supplementary connecting member mechanically and electrically connected thereto, which lies at the opposite end of the tension insulator, at least two of the runners being held in spaced horizontal relationship on opposite sides of the longitudinal centre line of the section insulator by at least one insulating or insulated elongate member which extends transversely of the longitudinal centre line.

Preferably, at each end of the section insulator end parts of the runners overlap and are interconnected by separate securing means.

In a preferred embodiment of the aforesaid section insulator, the section insulator consists of a single pair of runners, each runner being bowed outwards in a horizontal plane over a central portion of its length, the runners being held in spaced horizontal relationship by a single transversely extending insulating or insulated elongate member positioned approximately midway between the ends of the section insulator.

For the purpose of electrically separating two adjacent sections of an overhead electric traction system which are to be supplied with alternating or direct current from different substations, usually from different phases of the main supply system, a neutral section is inserted between these sections.

The mechanical connection as hereinbefore described is also especially, but not exclusively, suitable for use in the fabrication of a neutral section in which the contact wires of two adjacent sections of an overhead electric traction system are mechanically connected together but electrically separated by at least one runner comprising a tension insulator connected to the contact wire of one of said two sections, a second tension insulator connected to the contact wire of the other of said two sections, and an elongate metal member which separates and is connected to the other ends of said tension insulators and which may be electrically connected to earth, the undersurfaces of the contact wires, said tension insulators and the elongate metal member lying in a substantially common plane, wherein the mechanical connection between the elongate metal member and at least one of the tension insulators of the runner or of at least one of the runners is as hereinbefore described and, wherein, at each of a plurality of spaced positions along the length of the neutral section, the neutral section is or is adapted to be suspended from a supporting catenary wire or other supporting means by at least one dropper wire.

In one preferred embodiment of the aforesaid neutral section, the neutral section consists of a single pair of runners, the runners diverging outwards in a horizontal plane at each end portion of the neutral section and, over a central portion of its length, extending substantially parallel to one another and the runners being held in spaced horizontal relationship by transversely extending elongate members positioned at spaced positions along the length of the neutral section.

Where a supplementary connecting member is provided at the mechanical connection between the end parts of the or a tension insulator and the elongate metal member of the or each runner, it may also serve as the means to which the or a transversely extending insulating or insulated elongate member is secured and may carry at least one suitably shaped arcing horn. The supplementary connecting members may also serve as the means to which are connected dropper wires by which the fabricated equipment is suspended from an overhead catenary wire.

The or each transversely extending insulating or insulated elongate member may take any convenient form but it preferably comprises an elongate member of plastics insulating material having sheds at mutually spaced positions along its length.

The or each tension insulator of the fabricated equipment preferably comprises an elongate body of resin bonded glass fibre which is completely encapsulated in an abrasion-resistant resin, e.g. a cycloaliphatic resin or polytetrafluorethylene, and which preferably is of substantially rectangular cross-section. Preferably the undersurface of each tension insulator is serrated to reduce the risk of formation of a continuous carbon track along this surface. To facilitate effecting the mechanical connection with an end part of an elongate metal member, preferably each end part of the tension insulator has one or more than one hole in which is housed a metal bushing; preferably, also, the or each bushing protrudes from the hole in which it is housed to reduce the risk of crushing of the end part of the tension insulator when an end part of an elongate metal member and/or a supplementary connecting member is or are bolted thereto.

The invention is further illustrated by a description, by way of example, of two preferred forms of 25 kV section insulator and of a preferred 25 kV neutral section with reference to the accompanying drawings, in which:

FIG. 1 is a perspective view of the first form of section insulator;

FIG. 2 is a plan view of the section insulator shown in FIG. 1 with the overhead catenary wire and dropper wires omitted;

FIG. 3 is a perspective view of the preferred neutral section, and

FIG. 4 is fragmental detailed view of the mechanical connection between ends of a tension insulator and elongate metal member of the neutral section shown in FIG. 4.

In the first form of 25 kV section insulator shown in FIGS. 1 and 2, the contact wires 1, 11 of two neighbouring sections of an overhead electric traction system are mechanically connected together but electrically insulating from one another by a single pair of runners 5,5'. Each runner 5,5' is bowed outwards in a horizontal plane over a central portion of its length and the runners are held in spaced horizontal relationship by a transversely extending elongate insulator 9 positioned approximately midway between the ends of the section insulator. The section insulator is suspended by means of dropper wires 4 from overhead catenary wires 2, 12, which are associated with the neighbouring sections and are mechanically connected together but electrically insulated from one another by an electrical insulator 3.

Each runner 5,5' comprises a tension insulator 6,6' and an elongate metal member 7,7' mechanically connected together in accordance with the method of the present invention. At each end of the section insulator the runners 5,5' are attached to the end of the contact wire 1,11 in a known manner by end fittings 8 and are so disposed that the metal members 7,7' lie at opposite ends of the section insulator but overlap over a central portion of the section insulator.

The tension insulator 6,6' of each runner 5,5' consists of an elongate body of substantially rectangular cross-section made of resin bonded glass fibre and completely encapsulated in cycloaliphatic resin. The metal member 7,7' of each runner 5,5' is an elongate body of substantially rectangular cross-section made of a copper-based alloy. The tension insulators 6,6' and metal members 7,7' are so arranged that their opposed side faces lie in substantially vertical planes.

At each mechanical connection between neighbouring ends of the tension insulators 6,6' and metal members 7,7', end parts of the tension insulator and metal member overlap and are also overlapped by a supplementary metal connecting member 10, the overlapping end parts and the supplementary connecting member being interconnected by two longitudinally spaced bolts 14, the undersurfaces of the end parts of the tension insulator, metal member and supplementary connecting member, constituting a smooth running surface for a current collector.

Each supplementary connecting member 10 has an upstanding limb 15 to which one end of the transversely extending insulator 9 is secured and to which the lower end of a dropper wire 4 is attached. Suitably shaped arcing horns 16 are secured to the opposite ends of each supplementary connecting member 9.

In the 25 kV neutral section shown in FIGS. 3 and 4, the contact wires 41, 51 of two adjacent sections of an overhead electric traction system are mechanically connected together but electrically separated by a single pair of runners 45,45' which diverge outwards in a horizontal plane at each end portion of the neutral section and, over a central portion of its length, extend substantially parallel to one another, the runners being held in spaced horizontal relationship by three transversely extending elongate metal members 49 at spaced positions along the central portion of the neutral section. The neutral section is suspended by dropper wires 44 from an overhead metal rod 43 which is mechanically connected to but electrically insulated from overhead catenary wires 40, 50 of the system by electric insulators 42.

Each runner 45,45' comprises a tension insulator 46,46' connected to contact wire 41, a tension insulator 48,48' connected to contact wire 51 and an elongate metal member 47,47' which separates and is mechanically connected at each of its ends to the tension insulators in accordance with the present invention. Each tension insulator 46,46'; 48,48' is an elongate member of substantially rectangular cross-section made of resin bonded glass fibre and wholly encapsulated in cycloaliphatic resin and each metal member 47,47' is also of substantially rectangular cross-section and is made of copper-based alloy. At each mechanical connection between a tension insulator 46,46'; 48,48' and a metal member 47,47', neighbouring ends of the tension insulator and metal member abut and two supplementary connecting plates 52 positioned on opposite sides of and overlapping the butt joint are mechanically connected to the tension insulator and metal member by four longitudinally spaced bolts 53, the undersurfaces of the tension insulator, metal member and supplementary connecting member providing a smooth running surface.

At each end of the neutral section, ends of the tension insulators 46,46'; 48,48' are connected to the contact wire 41, 51 by metal terminal fittings 54, and the metal terminal fittings and neighbouring traversely extending metal member 49' carry suitably shaped arcing horns 55.

The invention of the present application has the important advantage that the fabricated equipment has an insignificant change in stiffness along its length and consequently there is little risk of deflection of a pantograph occurring as it travels through the equipment. In addition, a section insulator or neutral section can be made substantially shorter in length than the section insulators and neutral sections hitherto proposed and each has a weight more closely approaching that of the length of conventional contact wire that it replaces than any other section insulator or neutral section hitherto proposed.

What I claim as my invention is:

1. Fabricated equipment of an overhead electric traction system in the form of a section insulator in which the contact wires of two neighbouring sections of the system are mechanically connected together but electrically insulated from one another by at least two runners, each runner comprising a tension insulator and at least one elongate metal member mechanically connected together, which runners are attached at each of their ends to the end of a contact wire and are so disposed that the metal of one runner at one end of the tension insulator in the longitudinal direction, overlies the metal member of a second runner which lies at the opposite end of the tension insulator, at least two of the runners being held in spaced horizontal relationship on opposite sides of the longitudinal centre line of the section insulator and being insulated one from the other by at least one elongate insulating member which extends transversely of the longitudinal centre line, each said tension insulator being an elongate member of electrically insulating material and, in the mechanical connection between the tension insulator of each runner and the elongate metal member, an insulating end part of the elongate electrically insulating member and an end part of the elongate metal member overlap and are interconnected by separate securing means the undersurfaces of said end parts of the elongate electrically insulator material and the elongate metal member constituting a smooth running surface for a current collector travelling beneath and in contact with the mechanical connection.

2. Fabricated equipment as claimed in claim 1, which consists of a single pair of runners, each runner being bowed outwards in a horizontal plane over a central portion of its length, the runners being held in spaced horizontal relationship and being insulated one from the other by a single transversely extending insulating elongate member positioned approximately midway between the ends of the section insulator.

3. Fabricated equipment as claimed in claim 1 or 2, wherein, at each end of the section insulator end parts of the runners overlap and are interconnected by separate securing means.

4. Fabricated equipment of an overhead electric traction system in the form of a neutral section in which the contact wires of two adjacent sections of the system are mechanically connected together but electrically separated by at least one runner said neutral section comprising a first tension insulator connected at one end to the contact wire of one of said two adjacent sections, a second tension insulator connected at one end to the contact wire of the other of said two adjacent sections and spaced from the first tension insulator and an elongate metal member which separates and is connected to the other ends of said tension insulators, the undersurfaces of the contact wires, said tension insulators and the elongate metal member lying in a substantially common plane, wherein each tension insulator is an elongate member of electrically insulating material, and wherein, in the mechanical connection between the elongate metal member and at least one of the tension insulators of the runner or of at least one of the runners, an end part of the elongate metal member and an insulating end part of the elongate insulating member overlap and are interconnected by separate securing means the undersurfaces of said end parts of the elongate insulating member and the elongate metal member constituting a smooth running surface for a current collector travelling beneath and in contact with the mechanical connection, and wherein, at each of a plurality of spaced positions along the length of the neutral section, the neutral section is adapted to be suspended from a supporting caternary wire by at least one dropper wire.

5. Fabricated equipment as claimed in claim 4, which consists of a single pair of runners, the runners diverging outwards in a horizontal plane at each end portion of the neutral section and, over a central portion of its length, extending substantially parallel to one another and the runners being held in spaced horizontal relationship by transversely extending elongate members positioned at spaced positions along the length of the neutral section.

6. Fabricated equipment as claimed in claim 1 or 4 wherein at least one supplementary connecting member overlaps and is connected to said overlapping end parts by said separate securing means.

7. Fabricated equipment as claimed in claim 1 or 4, wherein those surfaces of the overlapping end parts of the elongate insulating member and elongate metal member that are in contact with one another are of substantially planar form and lie in substantially vertical planes.

8. Fabricated equipment as claimed in claim 1 or 4, wherein the overlapping end parts of the elongate insulating member and elongate metal member are connected together by at least two longitudinally spaced bolts.

* * * * *

UNITED STATES PATENT AND TRADEMARK OFFICE
CERTIFICATE OF CORRECTION

PATENT NO. : 4,350,851
DATED : September 21, 1982
INVENTOR(S) : ALAN E. SEDDON

It is certified that error appears in the above-identified patent and that said Letters Patent are hereby corrected as shown below:

Column 3, line 65, "insulating" should be --insulated--.

Column 5, line 12, "member" should be --members--.

Column 5, line 40, --member-- should be inserted after "metal".

Signed and Sealed this

Fifteenth Day of February 1983

[SEAL]

Attest:

GERALD J. MOSSINGHOFF

Attesting Officer

Commissioner of Patents and Trademarks